(12) United States Patent  
Butler, II

(10) Patent No.: US 8,881,271 B2  
(45) Date of Patent: Nov. 4, 2014

(54) SYSTEM AND METHOD FOR FORENSIC IDENTIFICATION OF ELEMENTS WITHIN A COMPUTER SYSTEM

(75) Inventor: James Robert Butler, II, Washington, DC (US)

(73) Assignee: Mandiant, LLC, Milpitas, CA (US)

( * ) Notice: Subject to any disclaimer, the term of this patent is extended or adjusted under 35 U.S.C. 154(b) by 1399 days.

(21) Appl. No.: 12/184,898

(22) Filed: Aug. 1, 2008

(65) Prior Publication Data

US 2010/0030996 A1 Feb. 4, 2010

(51) Int. Cl.
  G06F 12/14 (2006.01)
  H04L 29/06 (2006.01)
  H04L 9/32 (2006.01)
  G06F 9/44 (2006.01)
  G06F 21/57 (2013.01)

(52) U.S. Cl.
  CPC ................................ G06F 21/577 (2013.01)
  USPC .............. 726/22; 726/25; 713/165; 713/168; 713/187; 717/126; 717/131

(58) Field of Classification Search
  USPC ...................... 726/22, 25; 713/165, 168, 187; 717/126, 131
  See application file for complete search history.

(56) References Cited

U.S. PATENT DOCUMENTS

| | | | |
|---|---|---|---|
| 2006/0288197 A1* | 12/2006 | Swanson et al. | 713/1 |
| 2008/0123676 A1* | 5/2008 | Cummings et al. | 370/419 |
| 2008/0181215 A1* | 7/2008 | Bollich et al. | 370/389 |
| 2008/0244167 A1* | 10/2008 | Tolmie | 711/104 |

OTHER PUBLICATIONS

Seyed Mahmood Hejazi, Mourad Debbabi and Chamseddine Talhi; Automated Windows Memory File Extraction for Cyber Forensics Investigation; Journal of Digital Forensic Practice, vol. 2: pp. 117-131, 2008; Concordia University, Computer Security Laboratory, CIISE, Montreal, Quebec, Canada.

R.B. Van Baar, W. Alink, A.R. Van Ballegooij; Forensic Memory Analysis: Files Mapped in Memory; Digital Investigation 5; pp. 552-557, 2008; Netherland Forensic Institute, The Hague, Netherlands.

* cited by examiner

*Primary Examiner* — Aravind Moorthy  
(74) *Attorney, Agent, or Firm* — Adam C. Rehm; Polsinelli PC (57) ABSTRACT

A system and method for employing memory forensic techniques to determine operating system type, memory management configuration, and virtual machine status on a running computer system. The techniques apply advanced techniques in a fashion to make them usable and accessible by Information Technology professionals that may not necessarily be versed in the specifics of memory forensic methodologies and theory.

21 Claims, 10 Drawing Sheets

SYSTEM AND METHOD FOR FORENSIC IDENTIFICATION OF ELEMENTS WITHIN A COMPUTER SYSTEM

BACKGROUND OF THE INVENTION

As more businesses and government entities increasingly rely on computer networks to conduct their operations and store relevant data, security of these networks has become increasingly important. The need for increased security is emphasized when these networks are connected to non-secure networks such as the Internet. The preservation of important data and the ability to retrieve the data in the aftermath of a security breach has become the focus of Information Technology (IT) practitioners, particularly in the area of Incident Response (IR).

When a security breach occurs Incident Response Teams (IRTs) often respond, analyzing available information to determine the scope and risk associated with the breach. In order to accomplish this task they must collection information from IT assets, such as detection systems, firewalls, and computer systems. They must also collect data directly from potentially compromised assets to identify the methods employed by an attacker to accomplish the breach.

When attackers compromise an asset such as a computer system, they may install malicious software designed to damage a system, evade detection, or perform surveillance. In all cases these malicious programs ("malware") alter the normal state of the compromised system, making collection of accurate information about the system (which is something necessary for performing meaningful IR) very difficult for response personnel. Malware can alter the state of a computer system to make it appear a compromise has not occurred. Only through detailed inspection of multiple aspects of a running system can a responder hope to effectively identify and confirm a compromise.

In order to account for malware on a compromised system and collect accurate information that may aid in responding to an incident, forensic techniques may be employed to derive system information through direct examination of the contents of a computer system's memory. By employing software that analyzes the information, structures, and anomalies present in system memory, the ability of an attacker to camouflage its activities is greatly reduced. These approaches are collectively referred to as memory forensics. These techniques differ from traditional computer forensics in that the focus is in discerning the live state of a computer system through review of memory rather than looking at the "dead" state of a system through examination of the contents of storage media, such as hard drives.

The field of memory forensics is relatively new in the digital forensics arena, especially when compared to techniques in practice for the analysis of storage media. As such, many problems remain unsolved and new methods for memory analysis are being developed constantly. Existing methods face numerous challenges, such as the rapid change of modern operating systems, the variety of operating systems present in the marketplace today, and the fact that most information associated with live system state for a computer system is not a common topic of information sharing, particularly for proprietary operating system vendors. As such, the practice of memory forensics is relegated to a highly specialized cadre of computer and security researchers with advanced degrees and many years of experience in the field. A strong need exists in the industry to provide capabilities that utilize memory forensic techniques in such a way as to make their benefits accessible to IT professionals in various enterprise and organizational environments. In particular, a need exists to be able to accurately identify various elements within a computer system, including characteristics such as operating system type and version, memory management configuration, and virtual machine state of the computer system.

SUMMARY OF THE INVENTION

In response to this need, the present application describes a method and system for utilizing memory forensic techniques to identify an operating system, its memory utilization configuration, and virtual machine state.

In an embodiment, a plurality of values representing data contained within a memory of a computer system can be accessed, those valued can be searched for a first identifying characteristic that indicates an operating system and, upon finding the first identifying characteristic, searched for a second characteristic that indicates an operating system. The distance within the memory of the computer system can be analyzed between the first identifying characteristic and the second identifying characteristic, leading to a determination, from the distance, of a type and a version of an operating system loaded into the computer system's memory.

In another embodiment, a plurality of values representing data contained within a memory of a computer system can be accessed, those valued can be searched for a first one or more identifying characteristics that indicate a system structure used for memory management. The addresses in the memory corresponding to the values of the one or more identifying characteristics can then be determined and the structure of addresses to identify one or more methods for memory management in use within the computer system can be analyzed.

In another embodiment, a plurality of values representing data contained within a memory of a computer system can be accessed and those values can be searched for one or more identifying characteristics that indicate a virtual system. Processes corresponding to those characteristics can then be analyzed to determine if the process is running on at least one of computer hardware and a virtual environment In yet a further embodiment, all three methods outlined can be used to provide a set of memory forensic features that can provide valuable forensic information to Incident Response Teams without requiring them to have the same level of knowledge as experts currently developing techniques in the memory forensics field.

DETAILED DESCRIPTION

The present application describes methods and systems for forensic identification of operating system type and version, memory management configuration, and virtual machine status on a computer system. Various embodiments can be used together. In one embodiment, software can execute on a computer system to be examined. In another embodiment, software can execute on another system not under examination but take as input a file containing the entire contents of system memory from a computer system of interest that is under examination.

Various embodiments can work with a real system or a virtual machine. A real system is compromised of an operating system running directly on a single instance of computer hardware. A virtual machine is a bounded software environment (a virtual environment) that emulates an additional layer of computer hardware and runs on actual computer hardware. A virtual machine can allow various computer software applications to be run within this software-emulated-hardware environment. One virtual environment may in turn run several virtual machine inside of it, effectively emulating multiple hardware platforms. This technique has many benefits in IT environments and is a common practice in modern enterprises. When examining a computer system during the course of an incident response, it is important be able to determine if virtual machines are running in a virtual environment on a real system in order to guide interpretation of results from conducting forensic analysis.

The process of memory forensics involves either contemporaneously examining the active running state of a computer system by reviewing its memory or capturing the running state of a computer system into a persistent representation (such as a file stored on a disk), which is then reviewed at a later time. In either case the examiner must understand the structures stored in the memory of the computer system in order to extract relevant data. A great deal of information may be derived from this data, including but not limited to information about the programs running on the computer system, data being accessed or manipulated by the computer system, and communications information (e.g., network connections, data being transferred, remote parties attempting to connect to the computer system).

The information stored in a computer system's memory varies widely based on the type and version of operating system being executed, features enabled or disabled within the operating system, and the configuration of the execution environment (such as hardware). Determining this information is critical to being able to conduct successful memory forensics on memory data from a computer system.

Figure 1:
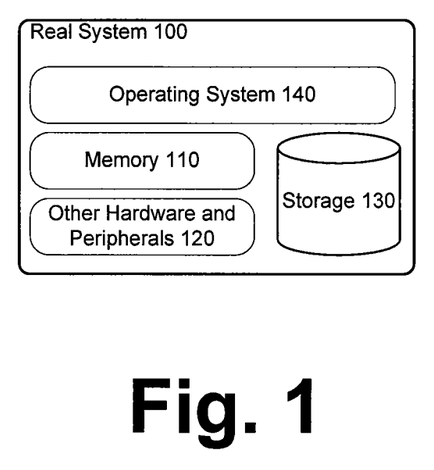
FIG. 1. depicts the basic functional areas of a real computer system.
Figure 2:
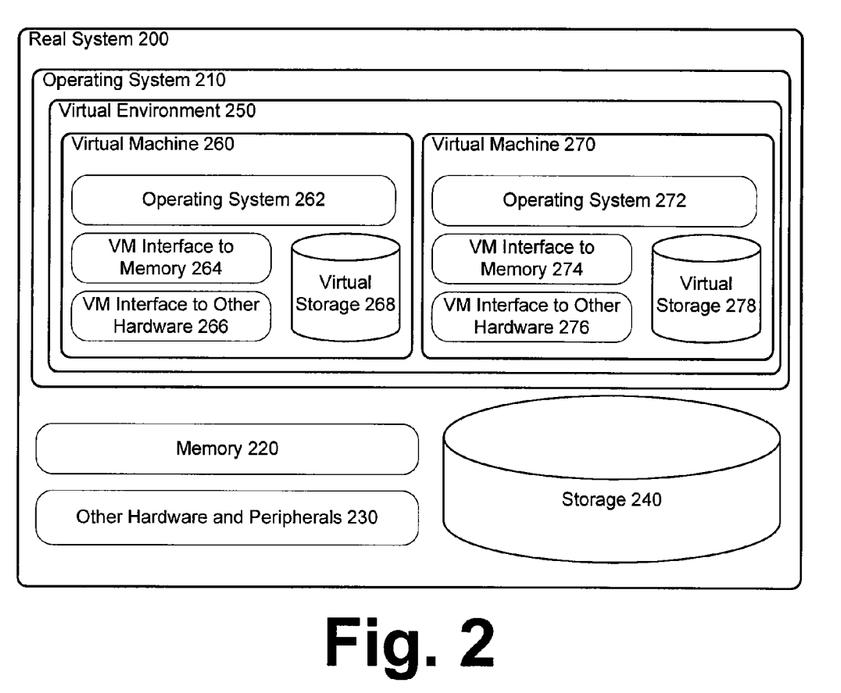
FIG. 2. depicts a series of computer systems running as virtual machines inside of a virtual environment on a real computer system.

The analysis can further be complicated if the computer system is running as a virtual machine. FIG. 1 outlines the components of a real system (i.e., physical machine), while FIG. 2 depicts a virtual environment comprising one or more virtual machines. Note that in each figure a real system is present (real system 100 and real system 200 respectively). In the real system depicted in FIG. 1, the operating system 140 can execute directly in the hardware environment, interacting with subsystems such as memory 110, storage 130, and other hardware and peripherals 120.

Within the virtual environment 250 in FIG. 2, operating system 262 can execute on a virtual interface emulated by virtual machine 260 and operating system 272 can execute on a virtual interface emulated by virtual machine 270. Virtual machine 260 and virtual machine 270 can be provided by virtual environment 250, which can be running on an operating system 210. Operating system 210 can be running on real system 200. It is, therefore, extremely important to be able to determine if data obtained from system memory is from a real system or a virtual machine system within a virtual environment.

Figure 3:
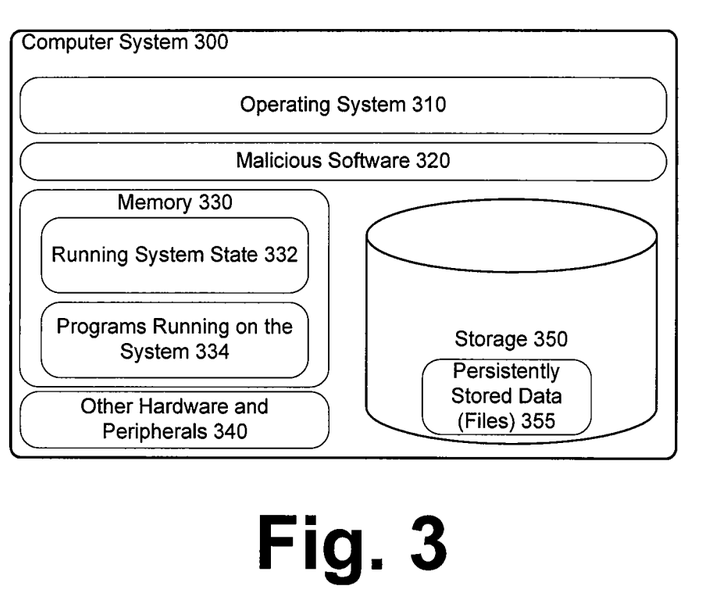
FIG. 3. depicts how malicious software may run in a computer system, and the types of information stored within memory and on storage devices within a computer system.

Forensic examination of a computer system may need to be undertaken for a number of reasons. Memory forensic techniques, in particular, are used in situations where understanding the live, running state of a computer system is critical to accomplishing the task at hand (including incident response). Modern attackers often use malicious software, or malware, that may only be examined or understood when it is observed executing in the memory of a computer system. FIG. 3 depicts how malicious software 320 may inject itself into a computer environment and subvert actions of the operating system 310 by interfering with how it interacts with its execution environment (e.g., the physical hardware or virtual environment it is running in). Various embodiments utilize techniques that allow a forensic examiner to determine characteristics of a computer system by observing the contents of memory rather than directly interrogating the environment itself. This is important because on a compromised system, malicious software 310 can be programmed to interfere with direct interrogation methods by substituting or altering responses to queries. For example, malicious software could be programmed to obscure the presence of another program running on the system or a file stored on a disk.

Figure 4:
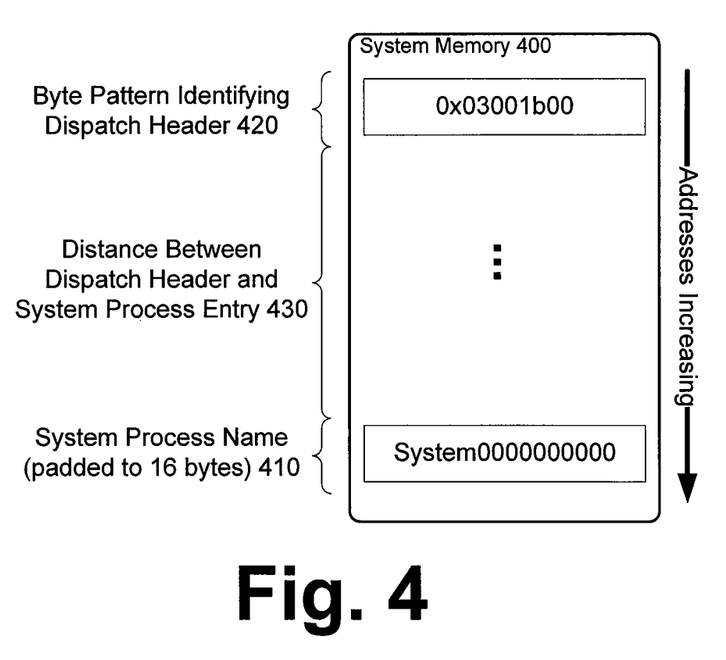
FIG. 4. depicts an embodiment that uses specific characteristics of the structure of an operating system to identify its core process within the memory of a running computer system and identify the type and version of the running operating system.

In an embodiment, the contents of memory as depicted in FIG. 4 can be read so that the operating system type and version (within either computer system memory or a file containing the contents of memory from a computer system) can be identified. In this particular case, system memory 400 can be scanned from its lowest address to its highest address and searched for an identifier that indicates the presence of the structures representing the core process of a computer system. In an embodiment that can operate on computer systems running an operating system such as the operating system sold under the trademark MICROSOFT WINDOWS®, system memory 400 can be scanned for the process name System 410, which is the word "System" stored as 8-bit byte sequences according to the American Standard Code for Information Interchange (ASCII) followed by ten empty values (e.g., hexadecimal value 0x00). System memory 400 can then be scanned for a specific byte pattern 420 that indicates the beginning of another structure used by the operating system called the Dispatch Header. The address in memory where the system process name 410 is stored as well as the beginning of the dispatch header 420 can be determined and the distance in bytes between them measured. The result can then be compared to a table of information that identifies which operating system types and versions map to this distance; if a match is found then the Dispatch Header/System process distance information and corresponding operating system and version identifier can be output in a format readable either by an end user or another computer program.

Figure 5:
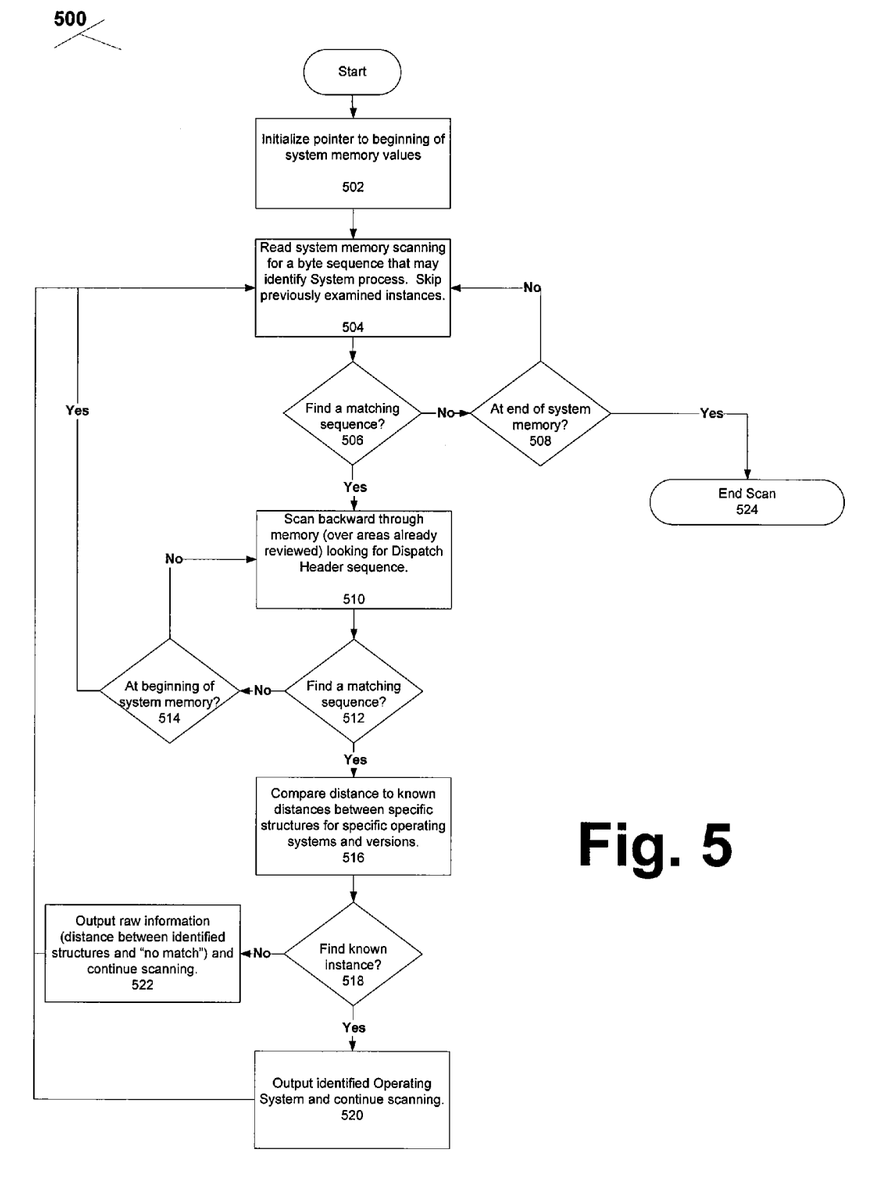
FIG. 5. depicts a flowchart that explains the detailed steps used by one embodiment of the invention to identify the type and version of an operating system by examining the contents of system memory of a computer system.

FIG. 5 is a flow chart 500 that depicts an embodiment that can include software executing on a computer system where memory is to be analyzed, or executing on another system taking the contents of a target computer system's memory as input. In an embodiment, a pointer can be initialized in a step 502 to the beginning of memory and memory can be read in a step 504 (where memory is either active memory or contents of memory provided as an input) to look for a sequence of bytes indicating the System process name. If a matching sequence is found in a step 506, then memory can be scanned in a step 510 in reverse from where the System process identifier was located looking for a byte sequence indicating the presence of the Dispatch Header. If the sequence is found in a step 512 the distance between Dispatch Header and System Process identifier can be calculated in a step 516, and the result examined in a step to see if it matches values for known operating systems and versions. Because an environment may contain multiple execution environments (e.g., a real environment with multiple virtual environments as depicted in FIG. 2) the scan may iterate in a step 520 through the rest of memory until all potential instances of the System process have been identified and the end of memory contents reached in a step 524.

Understanding the methods used to manage memory in a computer system is critical to determining the context of data observed during memory forensic operations. Memory contents and methods for interpretation will differ according to the memory management method in force. Memory management dictates the specific methods used by the computer system to allocate, reference, and utilize memory for the programs that execute in its environment. Methods utilized for memory management may differ according to hardware specification, operating system, operating system version, and system configuration. If these inputs are either provided directly from a computer system or otherwise available (e.g., in a file), memory management structures may be directly examined to determine the memory management methods and configuration in place on the computer system being examined.

In an embodiment, the memory management configuration of the computer system can be determined once the operating system type and version have been identified. For example, a determination can be made whether the computer system has enabled Physical Address Extensions (PAE). PAE is a method used in computer systems that allows a computer system that uses a 32-bit computer processor to utilize and access system memory configurations of greater than four gigabytes (32 bits allows a computer to represent a number between 0 and 4294967295; if PAE were not utilized a 32-bit computer system would only be able to use 4294967296 bytes of memory within the system).

Figure 6:
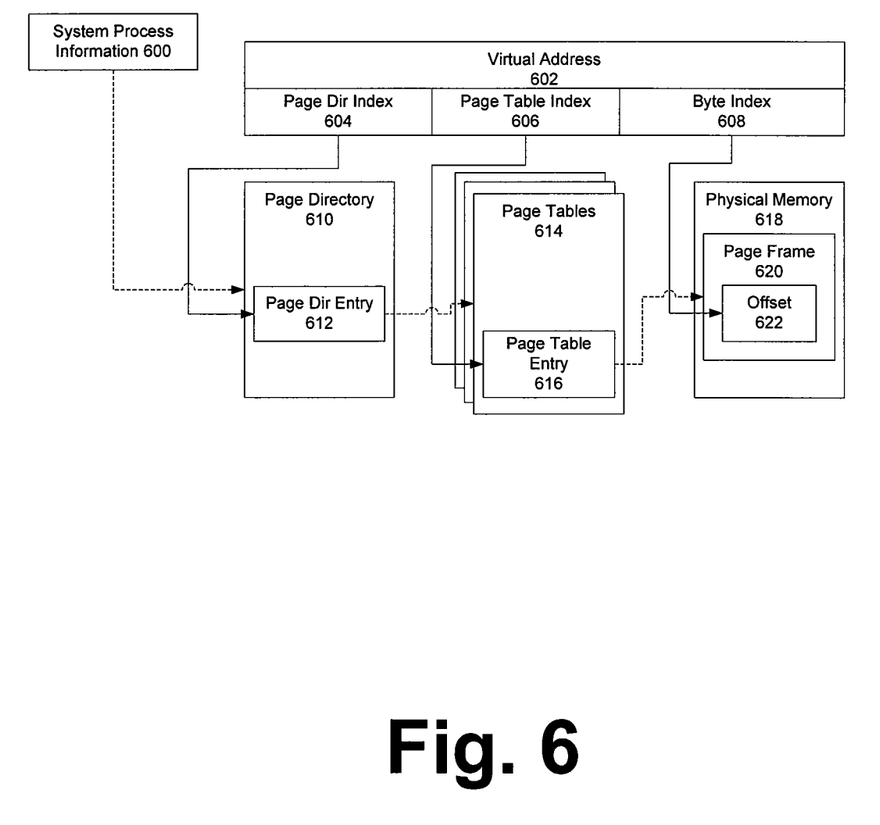
FIG. 6. depicts how management of system memory is performed on a computer system that does not have Physical Address Extensions (PAE) enabled.

FIG. 6 is a logical block diagram that depicts how a computer system may interpret memory addresses when PAE is not enabled. System Process Information 600 can contain a pointer to Page Directory 610. Page Directory 610 can be used as a starting point for interpreting memory addresses in order to find information stored at a given address. Addresses are typically represented as virtual addresses—that is, they must be interpreted in order to access the information they reference. A virtual address 602, for example, can be broken into several different fields, each used in combination with Page Directory 610 to identify where information is stored in physical memory 618.

Figure 7:
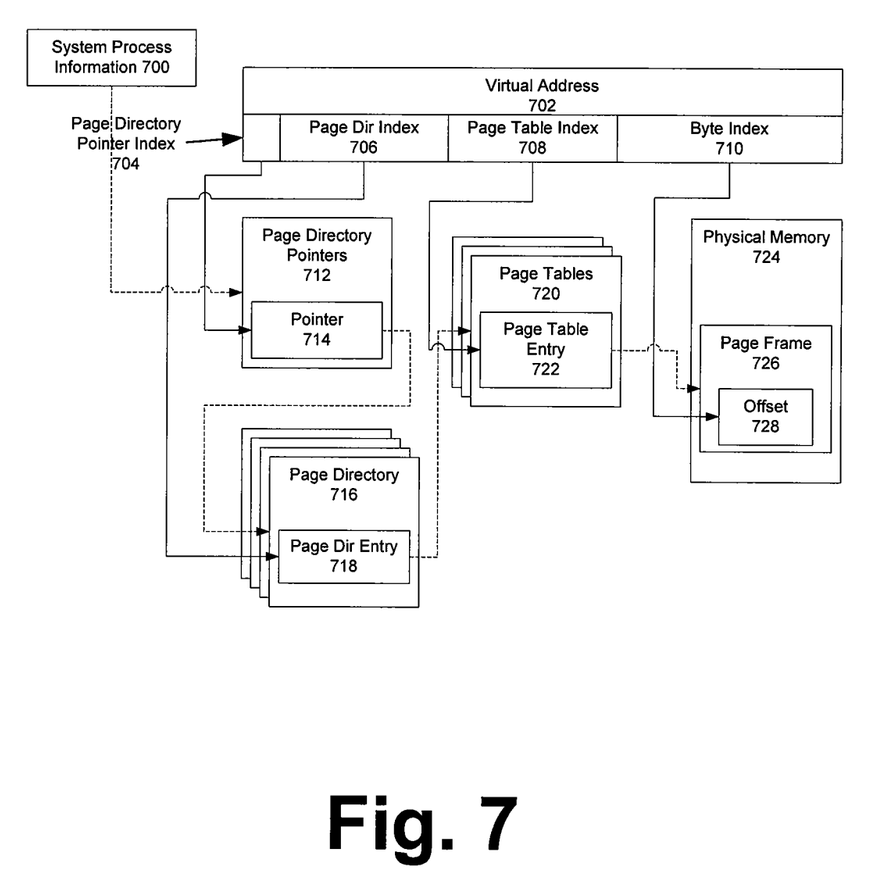
FIG. 7. depicts how management of system memory is performed on a computer system that does have PAE enabled.

FIG. 7 is a logical block diagram that depicts how memory addresses can be interpreted when PAE is enabled. In this instance, an additional level of indirection is added—in the place of Page Directory 610 shown in FIG. 6, a series of Page Directory Pointers 712 can be utilized to point to four different Page Directories 716. As demonstrated by FIG. 6 and FIG. 7, understanding the memory management configuration significantly alters how the contents of memory should be interpreted, and is therefore critical when performing memory forensics.

Figure 8:
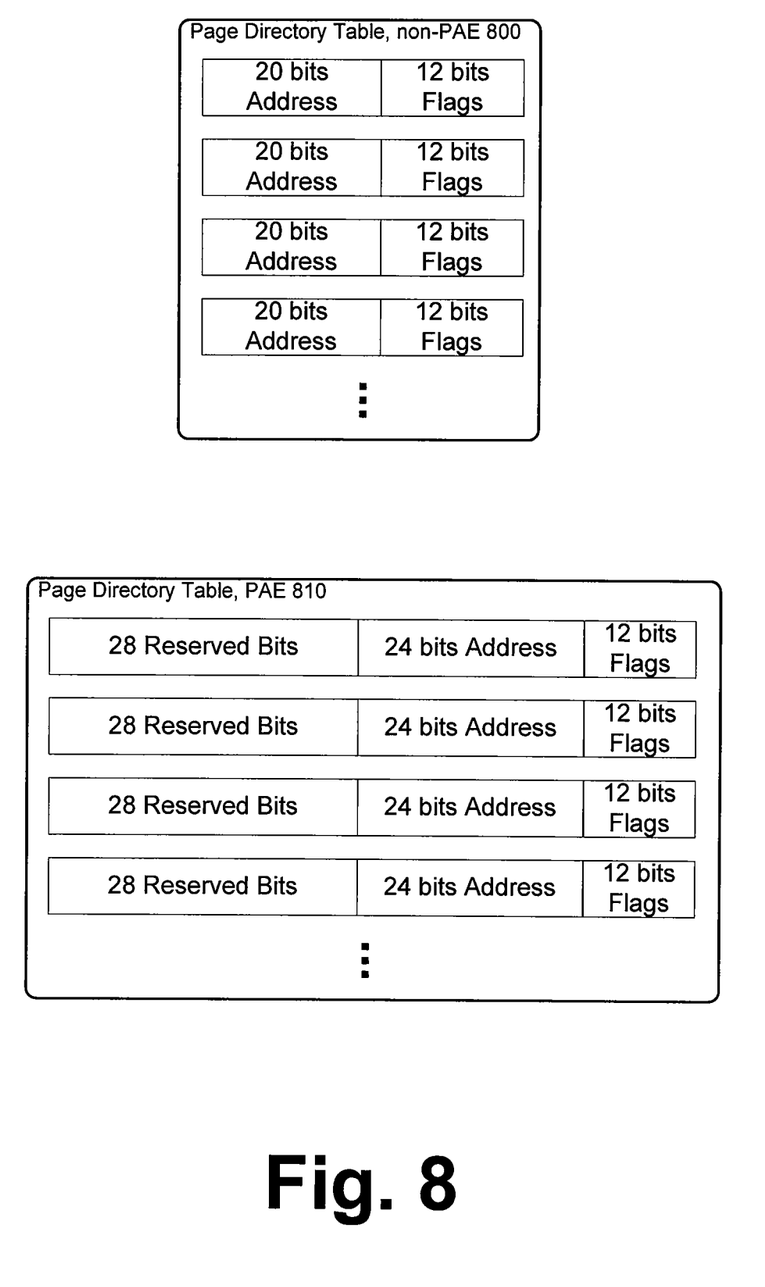
FIG. 8. depicts how memory addresses are specified in systems with and without PAE enabled.

Systems with PAE enabled use 24 bits to specify a memory address within a Page Directory Entry, as opposed to systems that do not have PAE enabled, which only use 20 bits. FIG. 8 depicts the differences between non-PAE addresses 800 and PAE addresses 810. Non-PAE entries utilize only 32 bits for addressing (20 bits for address, 12 bits for flags, 800), while PAE entries utilize 64 bits (28 bits reserved, 24 bits for address, and 12 bits for flags, 810). Reserved bits are always set to zero. This means that for PAE entries the first 32 bits of the entry will set at a maximum 4 bits, 810, which sets bounds on values for PAE address entries. In an embodiment, the entries in the Page Directory can be examined and a determination can be made if any portions of the entries exceed the values possible using 4 bits within a 32-bit block. If these values are exceeded, a conclusion can be reached that PAE is not enabled.

Figure 9:
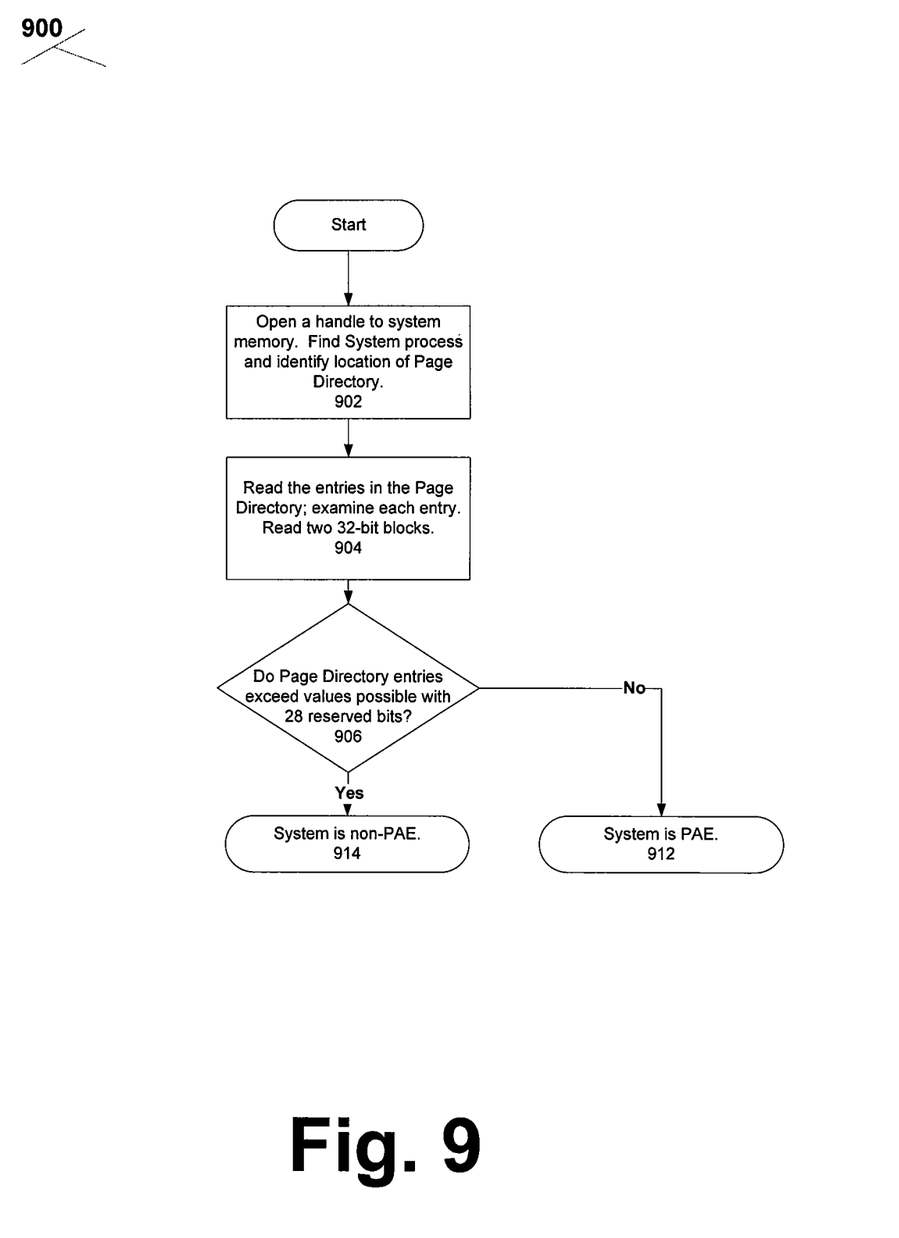
FIG. 9. depicts a flowchart describing how one embodiment of the invention examines structures in the memory of a computer system to determine whether PAE is enabled or disabled.

FIG. 9 is a flowchart that depicts the process 900 of determining if a system is running with PAE enabled or PAE disabled. Software is run on a system with memory to be examined or the contents of system memory are provided as an input. Memory values are read in a step 902, and the Page Directory identified and examined in a step 904. If any values are identified in the Page Directory that exceed the limits implied by having 28 bits reserved for a PAE configuration, then the determination is made that the system does not have PAE enabled in a step 914, else the determination is made that the system does have PAE enabled in a step 912.

Figure 10:
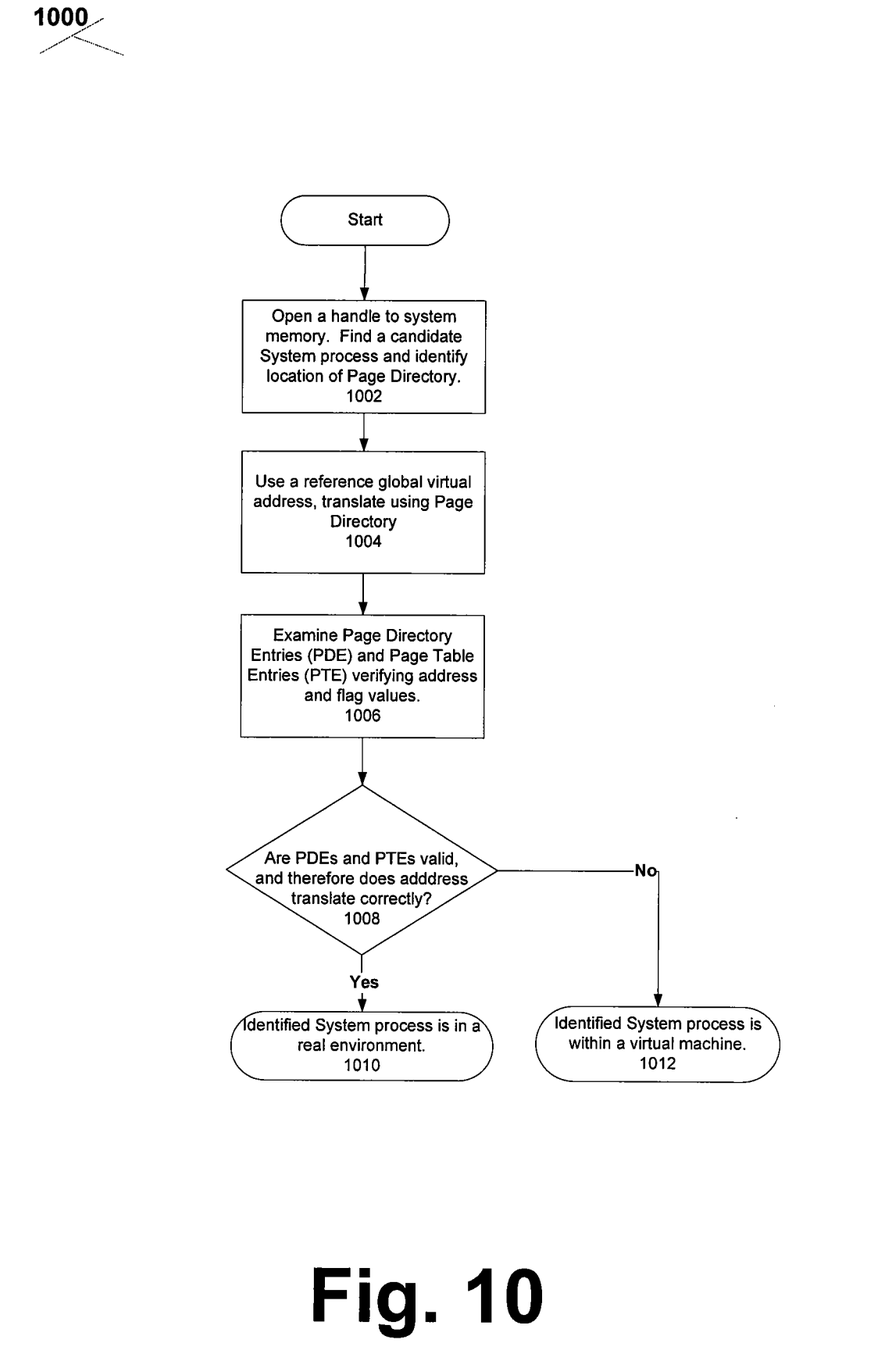
FIG. 10. depicts a flowchart describing how to use an examination of the contents of a computer system's memory to determine if core operating system processes found within memory are running on real physical hardware, or within a virtual machine.

When a System process is identified as depicted in FIG. 4, it is possible to determine if it corresponds to an operating system running on real hardware, or an operating system running in a virtual environment as depicted in FIG. 2. In an embodiment, this determination can be made as depicted in the process 1000 depicted in the flowchart in FIG. 10. Memory within the computer system can be scanned and the System process can be identified as depicted in FIG. 4. The Page Directory can be identified in a step 1002 (as discussed with reference to FIG. 6 and FIG. 7), and a determination can be made if PAE is enabled (FIG. 9). A global virtual address consistently provided by the operating system within the System process structure (e.g., an address that always has the same value, irrespective of how or where the operating system is running) can then be utilized in a step 1004 in conjunction with the Page Directory to translate the global virtual address and access its contents. To translate this address, the Page Directory can be examined in a step 1006, and the entry for the global virtual address can be validated (e.g., by verifying flags values are valid and that any address or reserved bits do not exceed maximum values as described in FIG. 9). The Page Directory Entry then can be followed in a step to a Page Table Entry, and the same validation is performed on the Page Table Entry in a step 1008. If the operation succeeds (that is, the Page Directory Entry and Page Table Entry are valid and a Physical Memory location is successfully accessed), then a determination can be made in a step 1010 that the System process identified is running in a real environment. If the operation fails, then a determination can be made in a step 1012 that the System process is executing within a virtual environment.

As these and other variations and combinations of the features discussed above can be utilized without departing from the present invention as defined by the claims, the foregoing description of the preferred embodiment should be taken by way of illustration rather than by way of limitation of the invention set forth in the claims.

The invention claimed is:

1. A method of forensically analyzing data comprising:
   accessing a plurality of values representing data contained within a memory of a computer system;
   searching the plurality of values for a first identifying characteristic that indicates an operating system;
   upon finding the first identifying characteristic, searching for a second identifying characteristic that indicates an operating system;
   measuring a distance within the memory of the computer system between (i) the first identifying characteristic and (ii) the second identifying characteristic; and
   determining, from the distance between (i) the first identifying characteristic and (ii) the second identifying characteristic, a type and a version of an operating system loaded into the computer system's memory.

2. The method of claim 1 wherein accessing a plurality of values further comprises retrieving data directly from one or more memory components contained within the computer system.

3. The method of claim 1 wherein accessing a plurality of values further comprises reading an input stream from a persistent storage device.

4. The method of claim 3 wherein reading an input stream further comprises reading a file from a hard drive of a computer system.

5. The method of claim 1 wherein the first identifying characteristic comprises a value that indicates a start of a known process.

6. The method of claim 5 wherein the known process is the 'System' process.

7. The method of claim 6 wherein the value that indicates the start of the 'System" process is 'System0000000000'.

8. The method of claim 1, wherein the distance between the first identifying characteristic and the second identifying characteristic is measured in bytes.

9. The method of claim 1, wherein the operating system is running on the computer system.

10. A method of forensically analyzing data comprising:
    accessing a plurality of values representing data contained within a memory of a computer system;
    searching the plurality of values for one or more identifying characteristics that indicate (i) an operating system running on the computer system, and (ii) a system structure used for memory management of the operating system running on the computer system;
    determining addresses in the memory corresponding to the plurality of values of the one or more identifying characteristics; and
    analyzing the system structure of the addresses to identify one or more methods for memory management in use within the computer system.

11. The method of claim 10 wherein accessing a plurality of values further comprises retrieving data directly from one or more memory components contained within the computer system.

12. The method of claim 10 wherein accessing a plurality of values further comprises reading an input stream from a persistent storage device.

13. The method of claim 12 wherein reading an input stream further comprises reading a file from a hard drive of a computer system.

14. The method of claim 10 wherein the one or more identifying characteristics is at least one of a page directory, a page directory pointer, a page directory entry, a page table, a page entry, and an offset.

15. The method of claim 14 further comprising:
    identifying a page directory within the memory;
    examining a page directory value contained within the page directory; and
    determining whether a known addressing scheme is in use within the memory based on whether the page directory value exceeds a limit.

16. The method of claim 15 wherein the known addressing scheme is a physical address extension and the limit is a value equal to a maximum page size.

17. A method of analyzing data comprising:
    accessing a plurality of values representing data contained within a memory of a computer system;
    searching the plurality of values for one or more identifying characteristics that indicate a virtual system; and
    analyzing at least one process corresponding to the one or more identifying characteristics to determine if the process is running on at least one of computer hardware and a virtual environment.

18. The method of claim 17 wherein accessing a plurality of values further comprises retrieving data directly from one or more memory components contained within the computer system.

19. The method of claim 17 wherein accessing a plurality of values further comprises reading an input stream from a persistent storage device.

20. The method of claim 19 wherein reading an input stream further comprises reading a file from a hard drive of a computer system.

21. The method of claim 17 wherein the one or more identifying characteristics comprises structures used for memory management.

* * * * *